United States Patent
Gotoh et al.

(10) Patent No.: US 7,568,839 B2
(45) Date of Patent: Aug. 4, 2009

(54) FLUID DYNAMIC PRESSURE BEARING, MOTOR, AND RECORDING MEDIUM DRIVING DEVICE

(75) Inventors: Hiromitsu Gotoh, Chiba (JP); Kazuaki Oguchi, Chiba (JP); Shinji Kinoshita, Chiba (JP); Chihiro Tazawa, Chiba (JP); Tomohiko Hayashi, Klong Luang (TH)

(73) Assignee: Seiko Instruments Inc. (JP)

( * ) Notice: Subject to any disclaimer, the term of this patent is extended or adjusted under 35 U.S.C. 154(b) by 332 days.

(21) Appl. No.: 10/589,422

(22) PCT Filed: Feb. 17, 2005

(86) PCT No.: PCT/JP2005/002491

§ 371 (c)(1),
(2), (4) Date: Aug. 15, 2006

(87) PCT Pub. No.: WO2005/078295

PCT Pub. Date: Aug. 25, 2005

(65) Prior Publication Data

US 2007/0177832 A1  Aug. 2, 2007

(30) Foreign Application Priority Data

Feb. 18, 2004  (JP) ............................. 2004-041510

(51) Int. Cl.
*F16C 32/06* (2006.01)
(52) U.S. Cl. .................. 384/107; 384/112; 384/123
(58) Field of Classification Search ............. 384/100, 384/107, 111–112, 119, 121–123, 131; 360/99.04, 360/99.07, 99.08; 310/67 R, 90
See application file for complete search history.

(56) References Cited

U.S. PATENT DOCUMENTS

| 3,497,273 | A | * | 2/1970 | Remmers Gerrit et al. .. 384/113 |
| 5,457,588 | A | * | 10/1995 | Hattori et al. ............ 360/99.08 |
| 5,504,637 | A | * | 4/1996 | Asada et al. ............. 360/98.07 |
| 5,770,906 | A | * | 6/1998 | Hazelton et al. ............... 310/90 |
| 5,988,886 | A | * | 11/1999 | Takahashi .................... 384/107 |
| 6,017,150 | A | * | 1/2000 | Lee ............................. 384/123 |

(Continued)

FOREIGN PATENT DOCUMENTS

JP  62194022 A  *  8/1987

(Continued)

*Primary Examiner*—Marcus Charles
(74) *Attorney, Agent, or Firm*—Adams & Wilks

(57) ABSTRACT

A fluid dynamic pressure bearing has an annular dynamic pressure generating face having a dynamic pressure generating groove, which draws a working fluid toward a midway position in the radial direction from the inside and outside of a thrust bearing plate in the radial direction when a shaft and a housing are rotated relative to each other. The dynamic pressure generating groove is provided on thickness direction end faces of the thrust bearing plate or on an inner surface of the housing, and an inner groove section is located on an inner peripheral side of the dynamic pressure generating face on the end faces and is recessed more than the dynamic pressure generating face in the thickness direction. A through-hole extends through the thrust bearing plate in the thickness direction so as to open to the dynamic pressure generating face, and a communicating cavity connects the opening portion of the through-hole and the inner groove section.

12 Claims, 14 Drawing Sheets

U.S. PATENT DOCUMENTS

| | | | |
|---|---|---|---|
| 6,264,368 B1 * | 7/2001 | Tanaka et al. | 384/112 |
| 6,354,742 B1 | 3/2002 | Iwaki et al. | 384/107 |
| 6,467,963 B2 * | 10/2002 | Sakuragi et al. | 384/107 |
| 6,483,215 B1 * | 11/2002 | Bodmer et al. | 310/90 |
| 6,760,187 B2 * | 7/2004 | Asada et al. | 360/99.08 |
| 7,196,868 B2 * | 3/2007 | Asada et al. | 360/98.07 |
| 7,413,347 B2 * | 8/2008 | Engesser et al. | 384/107 |

FOREIGN PATENT DOCUMENTS

| | | |
|---|---|---|
| JP | 02005615 | 1/1990 |
| JP | 10196643 | 7/1998 |
| JP | 10213133 | 8/1998 |
| JP | 11264409 | 9/1998 |
| JP | 00283155 | 10/2000 |
| JP | 01159420 | 6/2001 |
| JP | 2004183772 A * | 7/2004 |

* cited by examiner

FLUID DYNAMIC PRESSURE BEARING, MOTOR, AND RECORDING MEDIUM DRIVING DEVICE

CROSS REFERENCE TO RELATED APPLICATIONS

This application is a U.S. national stage application of International Application No. PCT/JP2005/002491, filed Feb. 17, 2005, claiming a priority date of Feb. 18, 2004, and published in a non-English language.

BACKGROUND OF THE INVENTION (a) Field of the Invention

The present invention relates to a fluid dynamic pressure bearing, a motor, and a recording medium driving device.

(b) Description of Related Art

Up to now, as this type of fluid dynamic pressure bearing, there are ones with the constructions disclosed in, for example, Japanese Unexamined Patent Publication No. 10-196643 (Patent Document 1) and Japanese Unexamined Patent Publication No. 10-213133 (Patent Document 2).

In this type of fluid dynamic pressure bearing, the gaps between the shaft and housing are filled with working fluid, and the shaft is supported rotatably relative to the housing, while maintaining the shaft and the housing such that they do not make contact with each other, by using dynamic pressure generated by the rotation.

The fluid dynamic pressure bearing in Patent Document 1 is provided with a thrust bearing plate (flange), in which dynamic pressure generating grooves are formed, on one end of a shaft, and is provided with through holes which pass through the thrust bearing plate in the axial direction on the inside, in the radial direction, of a ring area in which the dynamic pressure generating grooves are formed, for the purpose of circulatory supply of working fluid.

Furthermore, the fluid dynamic pressure bearing of Patent Document 2 is provided with a thrust bearing plate (thrust bearing plate section) having a step shaped dynamic pressure generating device on one end of a shaft, and which is provided with through holes which pass through the thrust bearing plate in the axial direction on the inside, in the radial direction, of the dynamic pressure generating device as breather holes for extracting air intermixed in the working fluid.

Moreover, in general, the dynamic pressure generating grooves formed on this thrust bearing plate are formed by a press operation, in which the thrust bearing plate is inserted in the thickness direction, due to considerations of manufacturing efficiency and manufacturing cost of the shaft.

In the case where the dynamic pressure generating grooves are formed on the end faces of the thrust bearing plate by a press operation, if there is no place for the material forming the thrust bearing plate to escape, there is an inconvenience in that dispersion occurs in the depth of the dynamic pressure generating grooves formed. In particular, the material from the parts positioned on the outside in the radial direction of the thrust bearing plate escapes outwardly in the radial direction when it is pressed in the axial direction. However, there is no place for the part positioned inside in the radial direction to escape. As a result, the dynamic pressure generating grooves are formed too shallow. In order to avoid this, it is typical for ring grooves (inner grooves), which are depressed one step lower than the ring area, to be formed inside the ring area on which the dynamic pressure generating grooves are formed, so that the material pressed towards the ring grooves can escape.

In the case where ring grooves are formed on the inner peripheral side of a ring area in which dynamic pressure generating grooves are formed, in the fluid dynamic pressure bearings disclosed in Patent Documents 1 and 2, through holes are formed in the ring grooves. However, in a state in which when the shaft is stopped, the shaft moves in one axial direction with respect to a housing, then regarding the ring area in which the dynamic pressure generating grooves are formed, due to a step difference between the ring grooves and the ring region, the gaps between the shaft and housing are much smaller than that for the ring grooves. Therefore, even if it is possible for working fluid to be supplied from the other end face side of the thrust bearing plate via the through holes provided in the ring grooves, a problem can be envisaged in that the working fluid in the through holes is obstructed by the step difference during start up, making it difficult for it to enter the gap between the shaft and the flange in the ring region.

Furthermore, as described above, during start up from a stopped state when the end face of the thrust bearing plate and the housing inner surface are close together, bubbles are generated in the locations where the absolute quantity of the working fluid is low, due to the negative pressure generated by the working fluid being drawn in by the dynamic pressure generating grooves. The generated bubbles stagnate in a wide range on the ring region when the shaft rotates, but after the shaft stops, they are likely to stagnate in the ring grooves. When bubbles are generated, the lubrication properties of the working fluid diminish, and the rotation becomes unstable. Therefore there are inconveniences of oscillation occurring and the like. Moreover, since the liquid surface of the working fluid rises due to the generation of bubbles, an inconvenience of leakage out of the housing can also be envisaged.

BRIEF SUMMARY OF THE INVENTION

The present invention has been made in view of the above circumstances, and therefore has an object to provide a fluid dynamic pressure bearing whereby the generation of bubbles can be suppressed by enabling the dynamic pressure generating grooves in the end face of the thrust bearing plate to be formed to a uniform depth by a press operation, and enabling a stable supply of working fluid to the dynamic pressure generating grooves, and oscillation at the time of rotation and leakage of working fluid can be prevented effectively by efficiently releasing any bubbles generated, and to provide a motor, and a recording medium driving device.

In order to achieve the above object, the present invention provides the following means.

The present invention provides a fluid dynamic pressure bearing comprising, a shaft having a shaft body and a thrust bearing plate which extends in the radial direction all around the outer peripheral surface of the shaft body, and a housing for housing the shaft such that it rotates freely, and with a working fluid filling a gap between the shaft and the housing. There is provided an annular dynamic pressure generating face made by forming a dynamic pressure generating groove, which draws a working fluid toward a midway position in the radial direction from the inside and outside of the thrust bearing plate in the radial direction, when the shaft and the housing are rotated relative to each other about the axis, on the thickness direction end face of the thrust bearing plate or on an inner surface of the housing facing the end face via a gap, and an inner groove section which is located on an inner peripheral side of the dynamic pressure generating face and that is depressed more than the dynamic pressure generating face in the thickness direction. Moreover there is provided a through hole which passes through the thrust bearing plate in the thickness direction so as to open to the dynamic pressure generating face, and there is provided a communicating cavity which connect the opening portion of the through hole and the inner groove section.

According to the present invention, using the inner groove section, which is provided on the inner peripheral side of the dynamic pressure generating face provided on the thrust bearing plate and that is depressed more than the dynamic pressure generating face in the thickness direction, it is possible for compressed material to escape on the inner peripheral side at the time of the press operation, wherein the thrust bearing plate is inserted in the thickness direction, thus enabling the dynamic pressure generating groove to be manufactured with a uniform thickness. Accordingly, it is possible to improve the manufacturing efficiency and reduce the manufacturing cost.

Furthermore, according to the fluid dynamic pressure bearing of the present invention, in a stopped state in which the shaft moves in one axial direction with respect to the housing and stops, if an effect for drawing working fluid is generated on the dynamic pressure generating face by rotating the shaft and the housing relative to each other, the working fluid moves from a large gap side on one end face side of the thrust bearing plate to a small gap side on the other end side via the through hole that passes through the thrust bearing plate in the thickness direction. In this case, according to the present invention, since the through hole opens to the dynamic pressure generating face, the working fluid that has traveled through the through hole is supplied directly to the dynamic pressure generating face. As a result, no excess negative pressure situation occurs in the dynamic pressure generating face, and bubbles can also be prevented from being generated.

Moreover, according to the fluid dynamic pressure bearing of the present invention, since the opening portion of the through hole is connected to the inner groove section provided on the inner periphery side of the dynamic pressure generating face via the communicating cavity, even if bubbles generated in the dynamic pressure generating face stagnate in the inner groove section, it is possible to release them from the through hole via the communicating cavity connected to the inner groove section. As a result, it is possible to prevent the working fluid on the dynamic pressure generating face from being exhausted, thus enabling the shaft and the housing to rotate relative to each other stably.

In the above invention, it is preferable that the communicating cavity is formed by a chamfer section formed in the opening portion of the through hole.

According to this invention, it is possible to connect the through hole and the inner groove section easily via the chamfer section provided in the opening portion of the through hole. Furthermore, using the chamfer section, it is possible to guide the working fluid supplied from the through hole to the gap between the dynamic pressure generating face of the thrust bearing plate and the inner surface of the housing smoothly.

Moreover, in the above invention, it is preferable that the communicating cavity is formed using a groove having an equal depth to the inner groove section. When the bubbles stagnating in the inner groove section escape from the through hole via the communicating cavity, there is no step difference between the communicating cavity and the inner groove section, and therefore they can escape to the through hole smoothly.

Furthermore, in the above invention, the arrangement may be such that the dynamic pressure generating groove is provided on the thrust bearing plate, the through hole is provided at a location coinciding with the dynamic pressure generating groove, and the communicating cavity is formed by a part of the dynamic pressure generating groove. This enables the working fluid to be supplied to the dynamic pressure generating face, and the bubbles to be discharged from the inner groove section similarly to as described above, without providing a special communicating cavity.

Moreover, in the above invention, the communicating cavity may be formed using an inclined groove, which gradually become shallower from the inner groove section toward the opening portion of the through hole.

By so doing, it is possible to exhaust the bubbles from the inner groove section to the through hole smoothly.

Furthermore, in the above invention, a plurality of the through holes may be provided around the central axis of the shaft with equal spacing in the circumference direction. By locating the through holes at equal spacing, it is possible to balance the weight when the shaft rotates about the central axis, and enable stable rotation.

Moreover, the present invention provides the above fluid dynamic pressure bearing, and a motor having a driving device, which rotates the housing and the shaft of the fluid dynamic pressure bearing relative to each other.

According to the invention, working fluid is supplied to the gap between the thrust bearing plate and the inner surface of the housing via the through hole during start up by the operation of the through hole provided in the thrust bearing plate, and therefore the shaft can be rotated stably and without oscillation.

Furthermore, the present invention provides a recording medium driving device, which comprises the above-described motor, and is provided with a fixing section which fixes a recording medium to the shaft or the housing.

According to the present invention, it is possible to rotate the disk shaped recording medium fixed to the fixing section of the shaft or the housing stably and without oscillation, so that errors can be prevented from occurring at the time of writing information to the recording medium, or reading therefrom.

According to the present invention, since the working fluid is supplied directly to the dynamic pressure generating face via the through hole by the operation of the through hole opening to the dynamic pressure generating face of the thrust bearing plate, an excess negative pressure region is prevented from occurring on the dynamic pressure generating face. Therefore, there is an effect in that it is possible, in advance, to prevent bubbles from being generated and oscillation from occurring. Moreover, by preventing bubbles from being generated, it is also possible to prevent the working fluid from being expelled by the bubbles and leaking through the gap. Furthermore, even if bubbles are generated, and stagnate in the inner groove section near the shaft body, it is possible to release the bubbles from the through hole efficiently via the communicating cavity, and prevent the bubbles from expanding in the dynamic pressure generating face.

BRIEF DESCRIPTION OF THE DRAWINGS

FIG. 3A is a drawing showing the end face on one side, and FIG. 3B is a diagram showing the end face on the other side.

FIG. 5A shows the end face on one side, and FIG. 5B shows the end face on the other side.

FIG. 7A shows the end face on one side, and FIG. 7B shows the end face on the other side.

FIG. 13A shows the end face on one side, and FIG. 13B shows the end face on the other side.

FIG. 14A shows the end face on one side, and FIG. 14B shows the end face on the other side.

FIG. 15A shows the end face on one side, and FIG. 15B shows the end face on the other side.

DETAILED DESCIPTION OF THE INVENTION

Hereunder is a description of a fluid dynamic pressure bearing, a motor, and a recording medium driving device according to a first embodiment of the present invention, with reference to FIG. 1 to FIG. 4.

Figure 1:
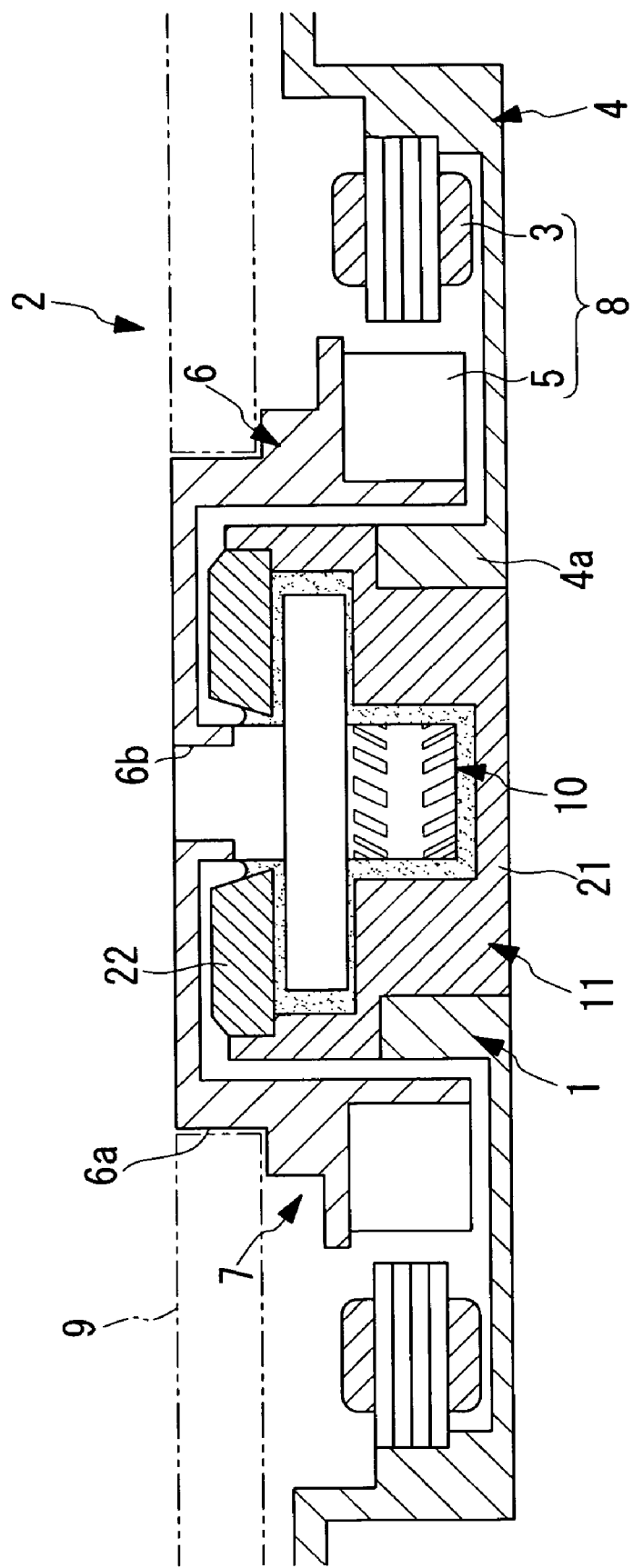
FIG. 1 is a longitudinal sectional view schematically showing a recording medium driving device and a motor according to a first embodiment of the present invention.

A fluid dynamic pressure bearing 1 according to the present embodiment is used in a recording medium driving device 2 as shown in FIG. 1. The recording medium driving device 2 is provided with a motor 7 comprising a stator 4 having coils 3 arranged in an annular shape, a rotor 6 that is located inside of the stator 4 and has permanent magnets 5 located opposite the coils 3, and a fluid dynamic pressure bearing 1 that supports the rotor 6 such that it can rotate with respect to the stator 4. A driving device 8 which rotates the rotor 6 with respect to the stator 4, is configured by the coils 3 provided in the stator 4 and the permanent magnets 5 provided in the rotor 6.

The rotor 6 is provided with a fitting section (fastening section) 6a onto which a ring-shaped recording medium 9 is fitted, and a fitting hole 6b into which a shaft 10 of the fluid dynamic pressure bearing, which is described later, is fitted. By fitting one end of the shaft 10 into the fitting hole 6b of the rotor 6, and by fitting the recording medium 9 onto the fitting section 6a of the rotor 6, the rotor 6, the recording medium 9 and the shaft 10 are joined together.

The stator 4 is provided with a boss 4a located in the center of the coils 3. By fitting a housing 11 of the fluid dynamic pressure bearing 1, which is described later, into the boss 4a, the permanent magnets 5 provided in the rotor 6 are located opposite the coils 3, and by the alternating magnetic fields generated by the coils 3 acting on the permanent magnets 5, the rotor 6 can be rotated with respect to the stator 4.

Figure 2:
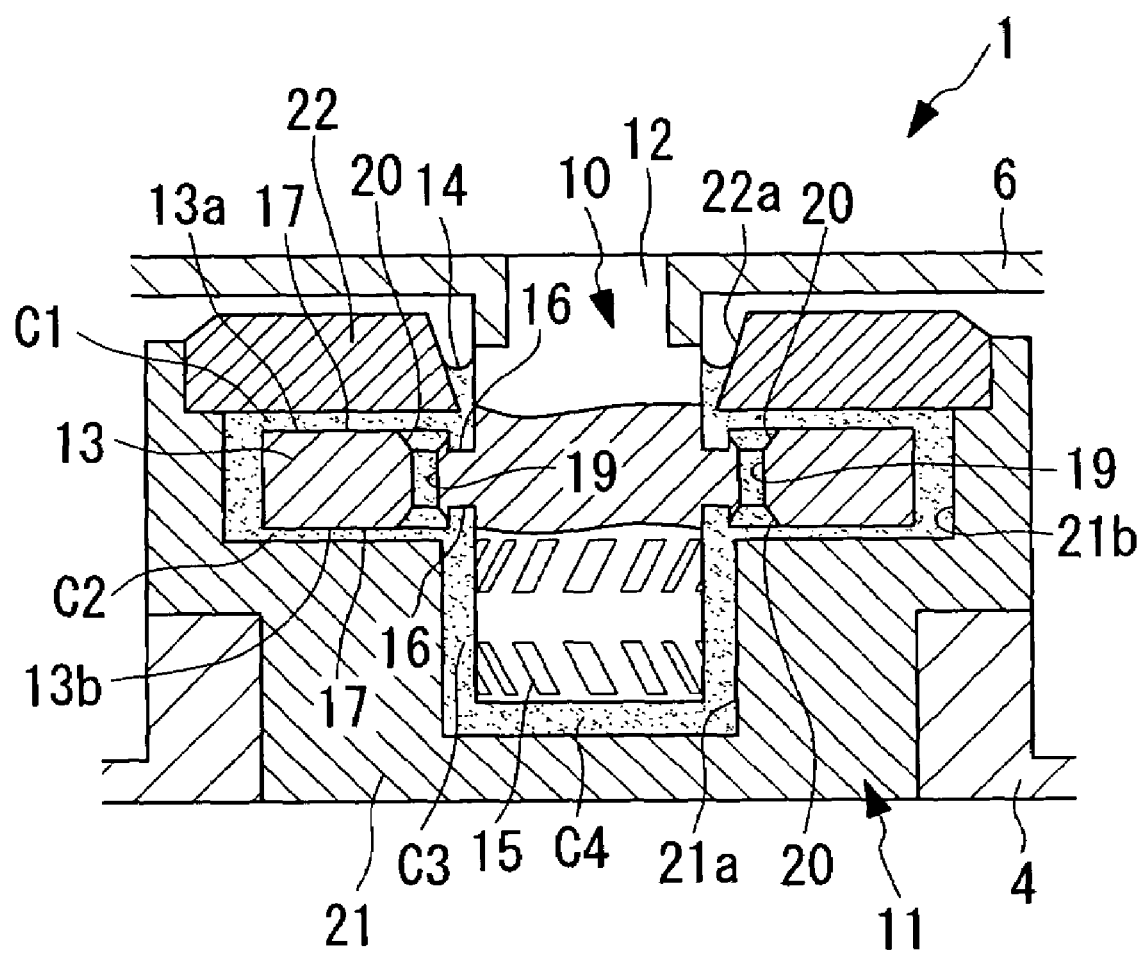
FIG. 2 is a longitudinal sectional view schematically showing a part of the fluid dynamic pressure bearing of the first embodiment used in the recording medium driving device and the motor of FIG. 1.

As shown in FIG. 2, the fluid dynamic pressure bearing 1 according to the present embodiment 1 comprises; a shaft 10 having a substantially cylindrical shaft body 12 and a flange shaped thrust bearing plate 13 that extends all around its peripheral surface in the radial direction located in an axial midway position of the shaft body 12, and a housing 11 for housing the shaft 10. The housing 11 is provided with an inner surface arranged with a minute gap with respect to the outer surfaces of the shaft 10, and the gap between the inner surface and the outer surface of the shaft 10 is filled with oil (working fluid) 14.

The shaft body 12 and the thrust bearing plate 13 are integrated. A plurality of radial dynamic pressure generating grooves 15, which are called herringbone grooves, is formed on the outer peripheral surface of the shaft body 12, located on one side of the thrust bearing plate 13 in the thickness direction. The radial dynamic pressure generating grooves 15 are formed by a combination of grooves that extend diagonally in one direction with respect to the generatrix of the cylindrical surface forming the outer peripheral surface of the shaft body 12 from the one end side of the shaft body 12, and grooves that extend diagonally in the opposite direction from the thrust bearing plate 13 side.

Figure 3A:
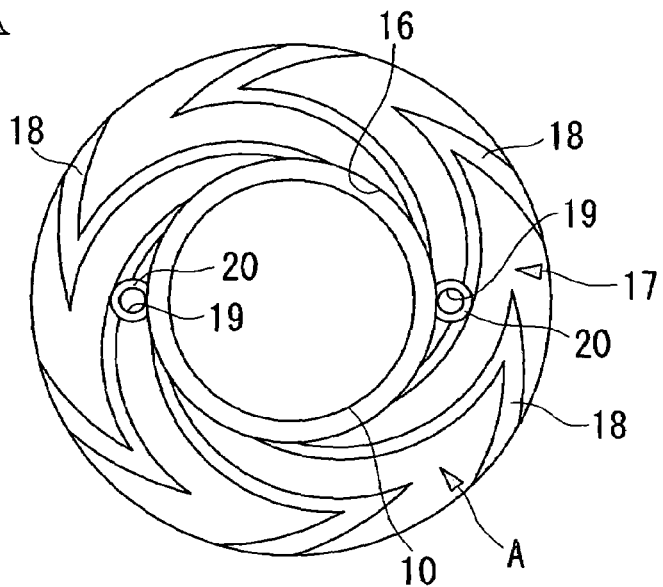
FIG. 3A and FIG. 3B are plan views showing dynamic pressure generating faces formed on the thrust bearing plate of the fluid dynamic pressure bearing of FIG. 2.

As shown in FIG. 3A and FIG. 3 B, the two thickness direction end faces 13a and 13b of the thrust bearing plate 13 are provided with annular ring grooves (inner groove sections) 16 formed in a full circle in the vicinity of the boundary with the shaft body 12, and annular dynamic pressure generating faces 17 located adjacent, outwardly in the radial direction, to the ring groove 16. Numerous thrust dynamic pressure generating grooves 18, called herringbone grooves, are formed in the dynamic pressure generating faces 17. The thrust dynamic pressure generating grooves 18 extend in an arc shape inclined in one direction with respect to the radial direction, outwardly in the radial direction from the ring groove 16 side, and then fold back at the midway position, extending to the outer peripheral rim inclined in the opposite direction.

The thrust dynamic pressure generating grooves 18 are formed on the end faces 13a and 13b of the thrust bearing plate 13 in a press operation. However, since the ring grooves 16, which are indented by one step lower than the dynamic pressure generating faces 17, are formed adjacent to the inner peripheral side of the dynamic pressure generating faces 17, the material forming the thrust bearing plate 13 can escape on the ring groove 16 side at the time of the press operation. Accordingly, the thrust dynamic pressure generating grooves 18 can be manufactured over the whole surface of the dynamic pressure generating faces 17 with a uniform depth.

Figure 3B:
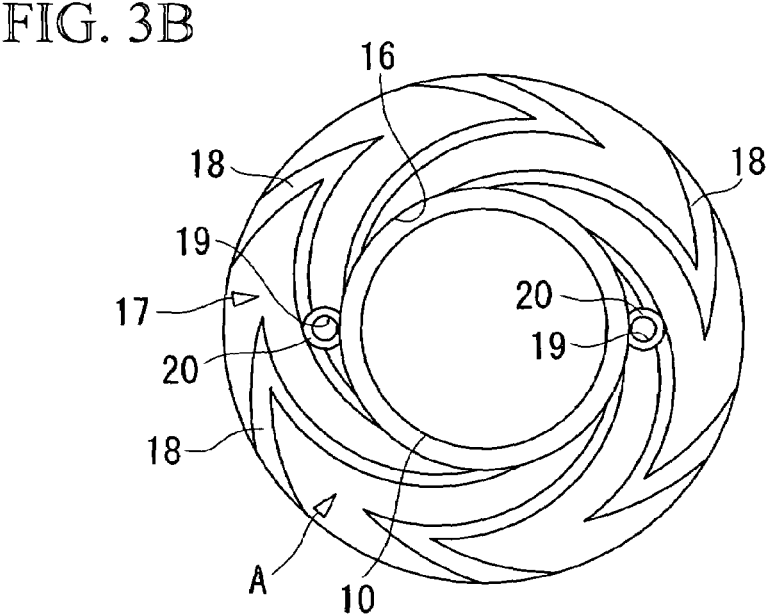
Figure 4:
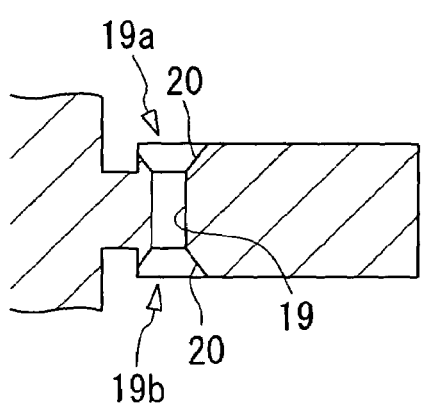
FIG. 4 is a longitudinal sectional view showing a part of the thrust bearing plate of the fluid dynamic pressure bearing of FIG. 2.

Furthermore, as shown in FIG. 3A, FIG. 3B, and FIG. 4, two through holes 19, which pass through the thrust bearing plate 13 in the thickness direction, are provided in the thrust bearing plate 13. The through holes 19 are positioned in the same radial direction at locations with a spacing of 180° around the central axis of the shaft body 12. The through holes 19 are provided with tapered chamfer sections 20, which are formed in the dynamic pressure generating faces 17 adjacent to the ring grooves 16, and expand gradually in the opening direction of the opening portions 19a and 19b, which open to the dynamic pressure generating faces 17. The chamfer sections 20 are formed in locations where they overlap the ring grooves 16 at the opening end side, and as a result, parts of the walls of the ring grooves 16 are notched, forming communicating cavities for connecting the through holes 19 and the ring grooves 16.

The housing 11 is provided with a substantially cylindrical housing body 21 that is blocked at one end and open at the other end, and an upper plate 22 that closes the open end of the housing body 21 in a state in which one end of the shaft body 12 protrudes. The housing body 21 is provided with a radial section housing cavity 21a with a small diameter, which houses the part of the shaft body 12 in which the radial dynamic pressure generating grooves 15 are formed, and a thrust section housing cavity 21b with a large diameter, which houses the thrust bearing plate 13.

The upper plate 22 is formed in a flat ring shape with a through hole 22a through the center of which the shaft body passes. The through hole 22a is formed with a tapered inner surface shape, whose diameter increases gradually toward the outside from the thrust section housing hole 21b. As a result, an annular shaped gap is formed, whose width increases between the outer surface of the shaft body 12 and the through hole 22a through which it passes, forming a capillary seal for holding oil 14 that fills the inside, by virtue of its surface tension, so that it cannot leak out.

Gaps C1 to C4 are provided between the inner surface of the housing 11 and the outer surface of the shaft 10 housed in the housing 11. That is, a uniform gap C3 is formed between the outer peripheral surface of the shaft body 12 in which the radial dynamic pressure generating grooves 15 are formed, and the inner surface of the radial, section housing hole 21a facing thereto in a state in which the shaft body 12 is located in the center of the radial section housing cavity 21a. Furthermore, the gaps C1 and C2 are formed between the dynamic pressure generating face 17 on one end face 13a of the thrust bearing plate 13, on which the thrust dynamic pressure generating grooves 18 are formed, and the inner surface of the upper plate 22 facing thereto, and the dynamic pressure generating face 17 on the other end face 13b and the bottom face of the thrust section housing cavity 21b facing thereto, respectively.

As a result, when the shaft 10 is rotated in one direction about the central axis with respect to the housing 11, oil 14 is drawn along the radial dynamic pressure generating grooves 15 from the one end side of the shaft body 12 and the thrust bearing plate 13 side, between the outer face of the shaft body 12 and the inner face of the radial section housing hole 21a. As a result, a region in which the dynamic pressure reaches a peak is formed all around the midway position in the longitudinal direction of the shaft body 12, so that the shaft body 12 is held in the center of the radial direction of the radial section housing hole 21a. Moreover, the oil 14 is drawn between the dynamic pressure generating faces 17 of the thrust bearing plate 13 and the bottom face of the thrust section housing cavity 21b and the inner face of the upper plate 22 facing thereto from the outer peripheral sides of the dynamic pressure generating faces 17, and the ring grooves 16 side, along the thrust dynamic pressure generating grooves 18. As a result, an annular shaped dynamic pressure generation area A in which dynamic pressure is generated is formed in a full circle. In this manner, the thrust bearing plate 13 is rotated while being held in approximately the central position between the bottom face of the thrust section housing cavity 21b and the inner face of the upper plate 22 in the axial direction.

Hereunder is a description of the fluid dynamic pressure bearing 1 according to the present embodiment constructed in this manner, and the operation of the motor 7 and the recording medium driving device 2, which are provided therewith.

In order to start operating the recording medium driving device 2 to rotate the recording medium 9, current is supplied to the coils 3 of the stator 4 incorporated in the motor 7, to thereby generate an alternating magnetic field in the coils 3. The rotor 6 is rotated by the alternating magnetic field acting on the permanent magnets 5. Since the recording medium 9 is fixed to the rotor 6, when the rotor 6 is rotated, the recording medium 9 is rotated together with the rotor 6.

Furthermore, when the rotor 6 is rotated in one direction, the shaft 10 fixed to the rotor 6 is also rotated in the same direction. At this time, by the thrust dynamic pressure generating grooves 18, and the radial dynamic pressure generating grooves 15, dynamic pressure is generated in the gaps C1 and C2 between the two thickness direction end faces 13a and 13b of the thrust bearing plate 13 and the inner face of the upper plate 22 and the bottom face of the thrust section housing hole 21a, and the gap C between the outer face of the shaft body 12 and the radial section housing hole 21a. Since the dynamic pressure generated on the outer face of the shaft body 12 is generated in a full circle uniformly, the shaft 10 is held in the central position of the radial section housing hole 21a in equilibrium. Moreover, since the dynamic pressure generated on the two end faces 13a and 13b of the thrust bearing plate 13 press the thrust bearing plate 13 in the thickness direction by equal dynamic pressures, the thrust bearing plate 13 is held in the axial central position of the space between the bottom face of the thrust section housing cavity 21b and the upper plate 22 in equilibrium.

In this case, when the motor 7 is stopped, since dynamic pressure is not generated, the shaft 10 drops down in the housing 11 in the direction of gravity. Accordingly, in the case where the recording medium driving device 2 is installed in the up/down relationship as shown in FIG. 1 for example, the shaft 10 drops down in the axial direction with respect to the housing 11, so that the gap C2 on the lower side is smaller than the gap C1 on the upper side. If the motor 7 starts operating in this state, the oil 14 is drawn through the gaps C1 and C2 outward in the radial direction from the ring grooves 16 side by the dynamic pressure generating grooves 18. However, in the fluid dynamic pressure bearing 1 according to the present embodiment, since the through holes 19 are provided opening to the dynamic pressure generating faces 17, the oil 14 is supplied from the large gap C1 on the upper side to the small gap C2 on the lower side via the through holes 19.

As a result, an excess negative pressure state is prevented from occurring in the small gap C2 due to the oil 14 being drawn through, which prevents bubbles from being generated in the oil 14 in advance. Especially, by opening the through holes 19 to the dynamic pressure generating faces 17, it is possible to supply the oil 14 to the dynamic pressure generating faces 17 directly, and it is possible to effectively prevent bubbles from being generated even if the oil 14 is drawn rapidly during starting. Moreover, according to the present embodiment, by the chamfer sections 20 being provided in the opening portions 19a and 19b, the oil 14 supplied from the through holes 19 to the dynamic pressure generation area A is supplied smoothly such that it spreads throughout the dynamic pressure generation area A, and hence it is even more effective.

By preventing bubbles from being generated in the oil 14, it is possible to prevent the dynamic pressure generated in the dynamic pressure generation area A from fluctuating, and to rotate the shaft 10 stably and without oscillation. Furthermore, by preventing bubbles from being generated, it is possible to always interpose the oil 14 between the shaft 10 and the housing 11, and to prevent damage and the like due to contact of the shaft 10 and the housing 11. Moreover, it is possible to prevent the oil 14 from being expelled from the gaps C1 to C4 due to the generation of bubbles, and to avoid the occurrence of an undesirable situation such as oil leakage or the like.

Furthermore, if bubbles are generated in the oil 14, or have been intermixed, when the motor 7 is stopped, the bubbles stagnate in the comparatively large capacity of the ring grooves 16. In the fluid dynamic pressure bearing 1 according to the present embodiment, since there are chamfer sections 20 which connect the through holes 19 opening to the dynamic pressure generating faces 17 and the ring grooves 16, the bubbles stagnating in the ring grooves 16 are guided to be released into the through holes 19 via the chamfer sections 20. Since the through holes 19 pass through the thrust bearing plate 13 in the thickness direction, and the upper part opening portion 19a is located close to the capillary seal section at atmospheric pressure, the bubbles released into the through holes 19 are released into the atmosphere through the capillary seal section from the upper part opening portion 19a.

That is, according to the present embodiment, even if bubbles are generated, they are not confined to the ring grooves 16 for a long time, and thus it is possible to prevent the bubbles from becoming congested in the dynamic pressure generation region A, causing the range of inconveniences as described above.

Furthermore, in the fluid dynamic pressure bearing 1 according to the present embodiment, since the through holes 19 are provided in two positions symmetrical about the central axis, the oil 14 can be distributed and supplied to the dynamic pressure generation area A. Moreover, it is also possible to balance the weight of the shaft 10.

According to the recording medium driving device 2 incorporating the motor 7 and the fluid dynamic pressure bearing 1 according to the present embodiment constructed in this manner, the recording medium 9 can be rotated stably without oscillation. Therefore, there is an advantage in that it is possible to write information to the recording medium 9, and to read information from the recording medium, reliably.

In the fluid dynamic pressure bearing 1 according to the present embodiment, the through holes 19 that pass through the thrust bearing plate 13 are provided in two places. However, alternatively, they may be provided in three or more places. In this case, by locating them at equal distances in the radial direction, and with equal spacing around the central axis in the circumferential direction, it is possible to balance the weight, and achieve an equal distribution supply of the oil 14 to the dynamic pressure generation region A from the through holes 19.

Figure 5A:
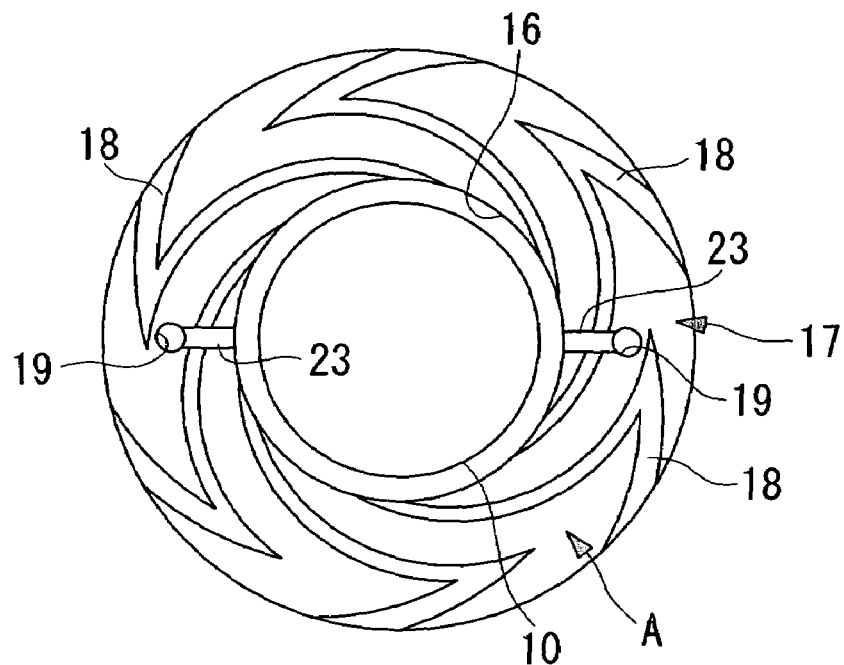
FIG. 5A and FIG. 5B are plan views showing thrust dynamic pressure generating faces in a modified example with through holes and communicating cavities provided in the thrust bearing plate of the fluid dynamic pressure bearing of FIG. 2.
Figure 5B:
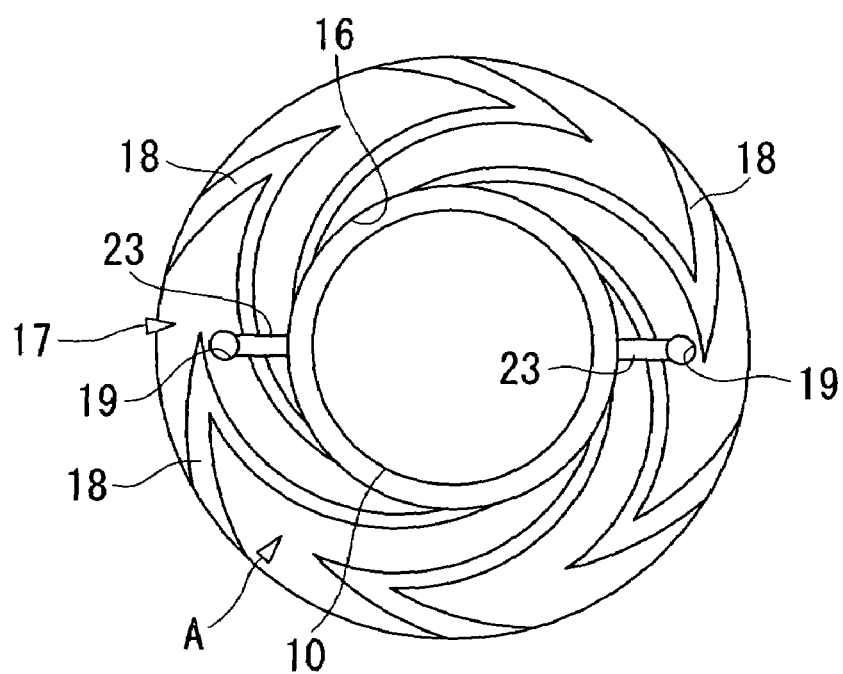
Figure 6:
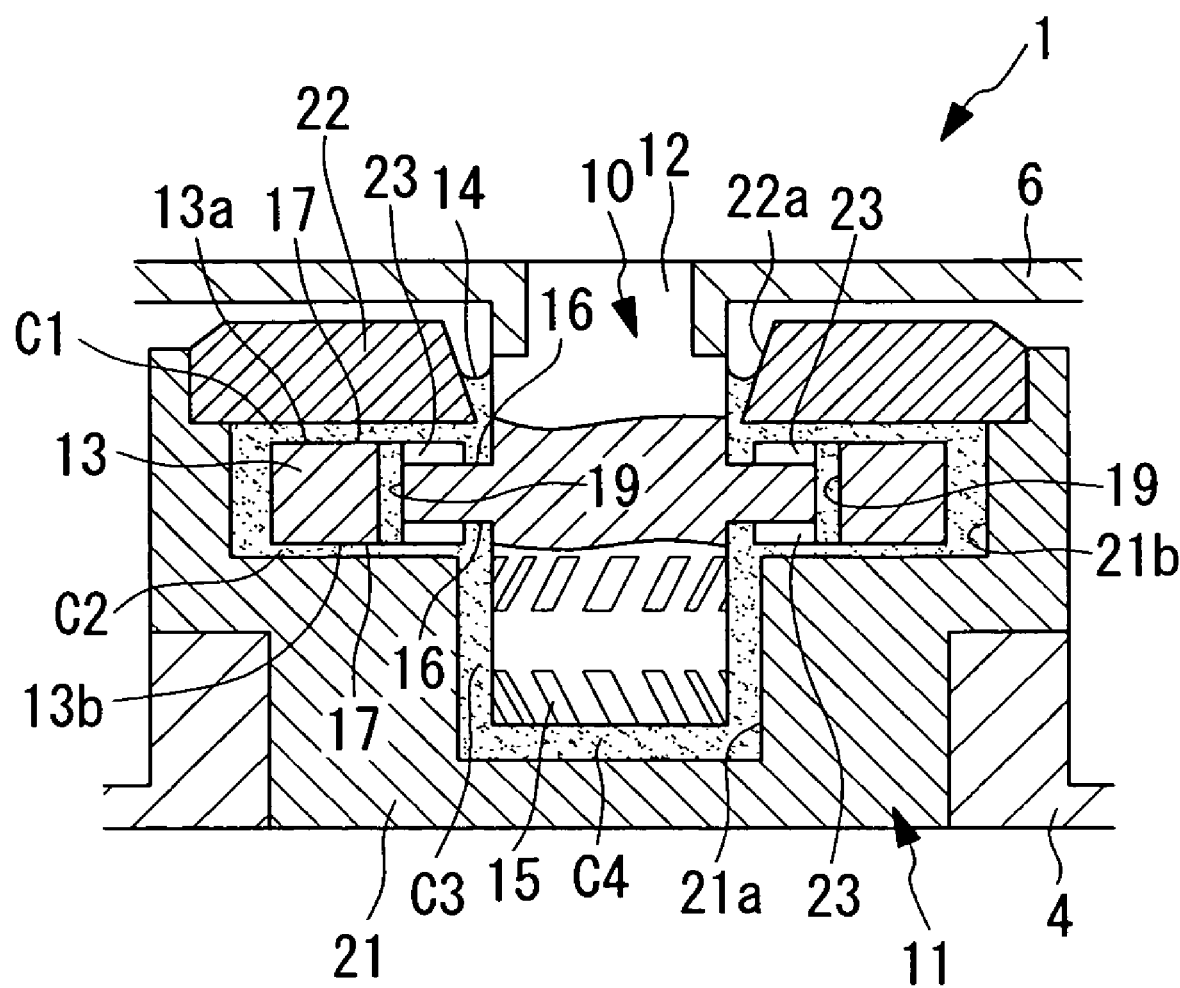
FIG. 6 is a longitudinal sectional view of a part of the fluid dynamic pressure bearing of FIG. 5A and FIG. 5B.

Furthermore, in the above-described embodiment, as shown in FIG. 2 and FIG. 4, communicating cavities are formed, which connect the ring grooves 16 and the through holes 19 via the chamfer sections 20 formed in the opening portions 19a and 19b of the through holes 19. However, alternatively, as shown in FIG. 5A, FIG. 5B, and FIG. 6, straight grooved communicating cavities 23, which connect the through holes 19 and the ring grooves 16 directly, may be formed. In this case, it is preferable that the depth of the communicating cavities 23 and the depth of the ring grooves 16 are approximately the same. This is because when bubbles are released from the ring grooves 16 to the through holes 19, they are discharged smoothly without a step difference. Moreover, slopes, whose depth decreases gradually from the ring grooves 16 toward the through holes 19, may be provided. This is because using slopes without a step difference, bubbles can be released to the through holes 19 smoothly.

Figure 7A:
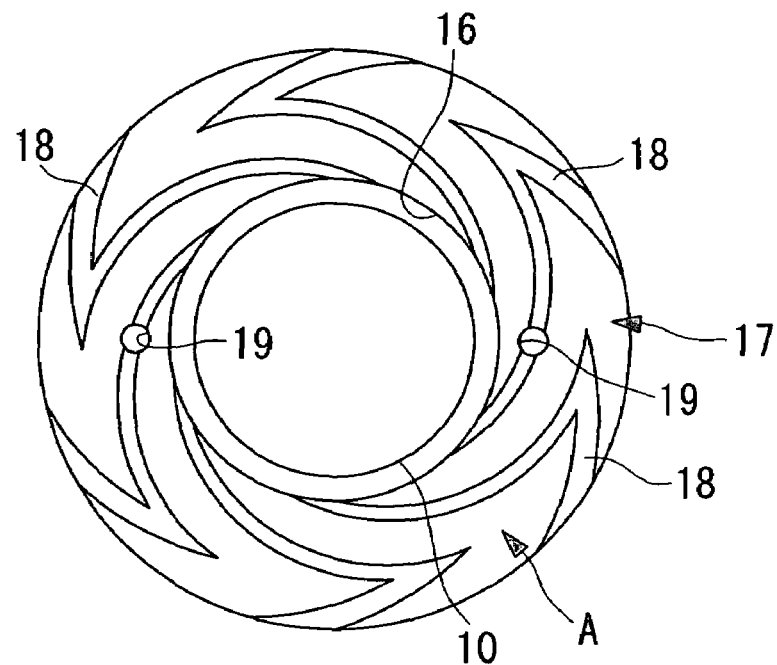
FIG. 7A and FIG. 7B are plan views showing thrust dynamic pressure generating faces in another modified example with through holes and communicating cavities provided in the thrust bearing plate of the fluid dynamic pressure bearing of FIG. 2.
Figure 7B:
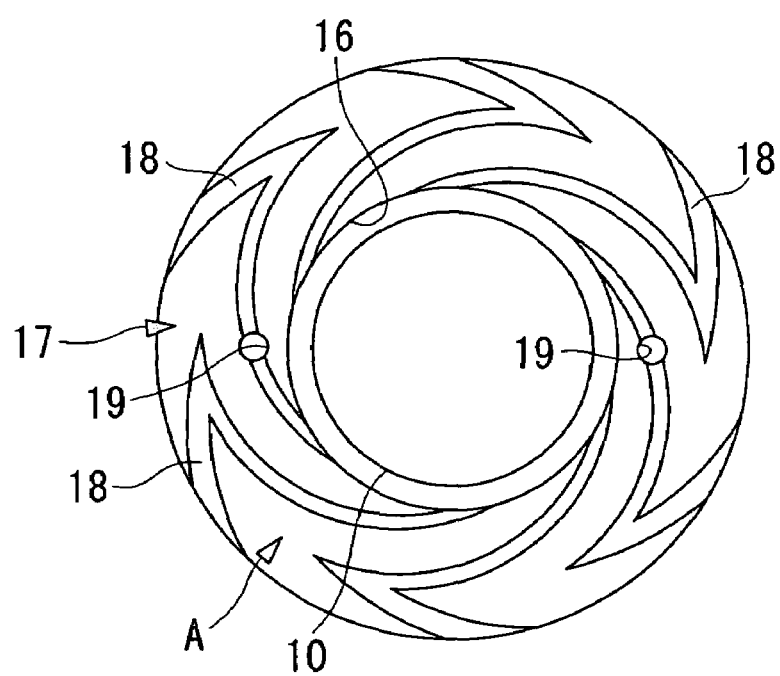

Furthermore, as shown in FIG. 7A and FIG. 7B, the arrangement may be such that the through holes 19 are formed in locations coinciding with some of the dynamic pressure generating grooves 18, and the dynamic pressure generating grooves 18 themselves are utilized as communicating cavities which connect the through holes 19 and the ring grooves 16.

Moreover, the radial dynamic pressure generating grooves 15 and the thrust dynamic pressure generating grooves 18 are provided in the outer peripheral surface of the shaft 10 and the end faces of the thrust bearing plate 13 respectively. However, alternatively, they may be provided in the inner surfaces of the housing 11 facing thereto. Furthermore, the case is described in which the shaft 10 is rotated with respect to the housing 11. However, alternatively, a construction may be used in which the shaft 10 is fixed, and the housing 11 is rotated.

Figure 8:
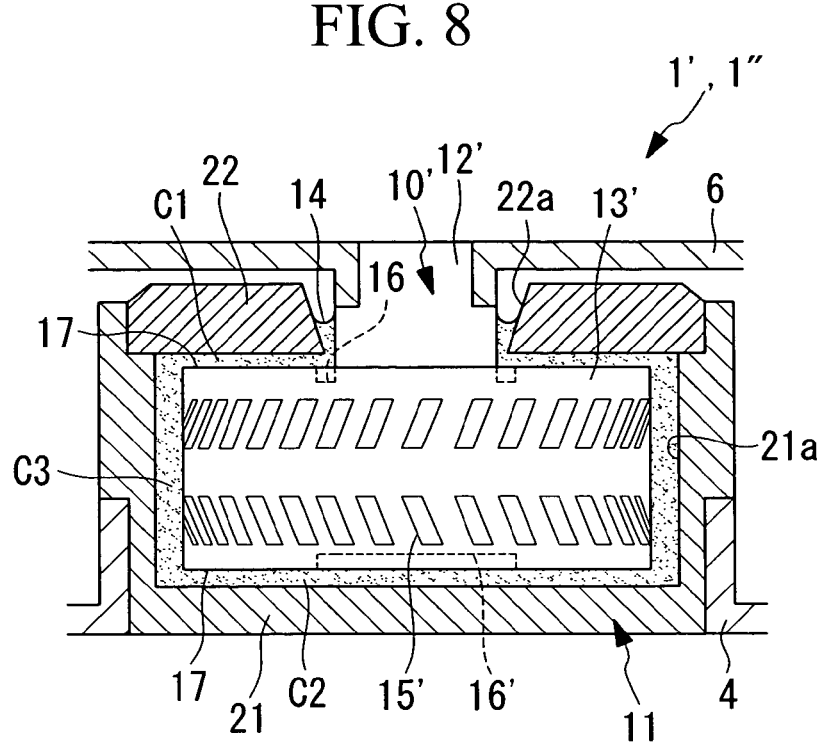
FIG. 8 is a longitudinal sectional view of a modified example of the part of the fluid dynamic pressure bearing of FIG. 2.
Figure 9:
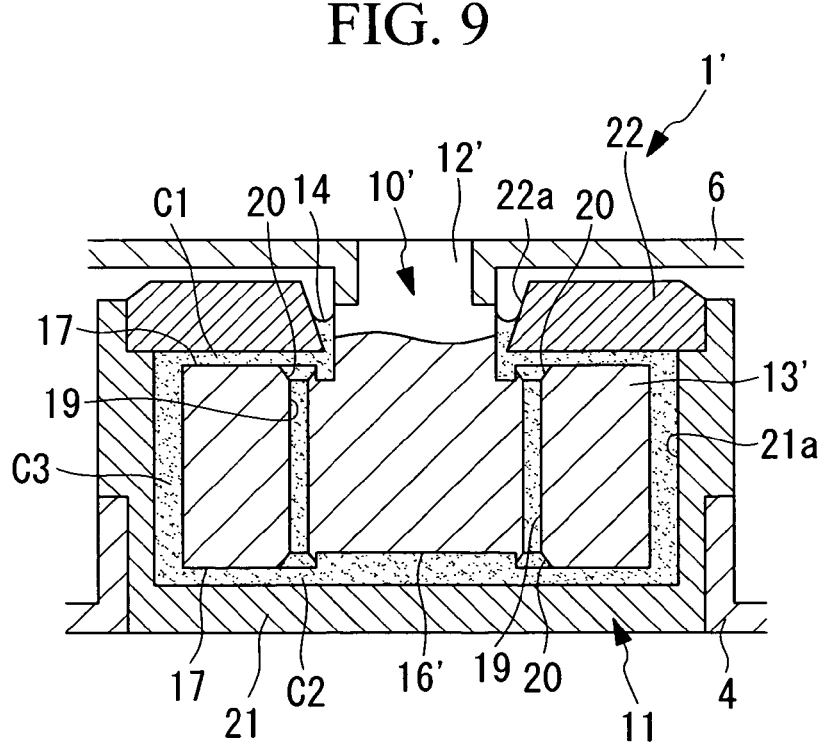
FIG. 9 is a longitudinal sectional view showing the thrust bearing plate of the fluid dynamic pressure bearing of FIG. 8.
Figure 10:
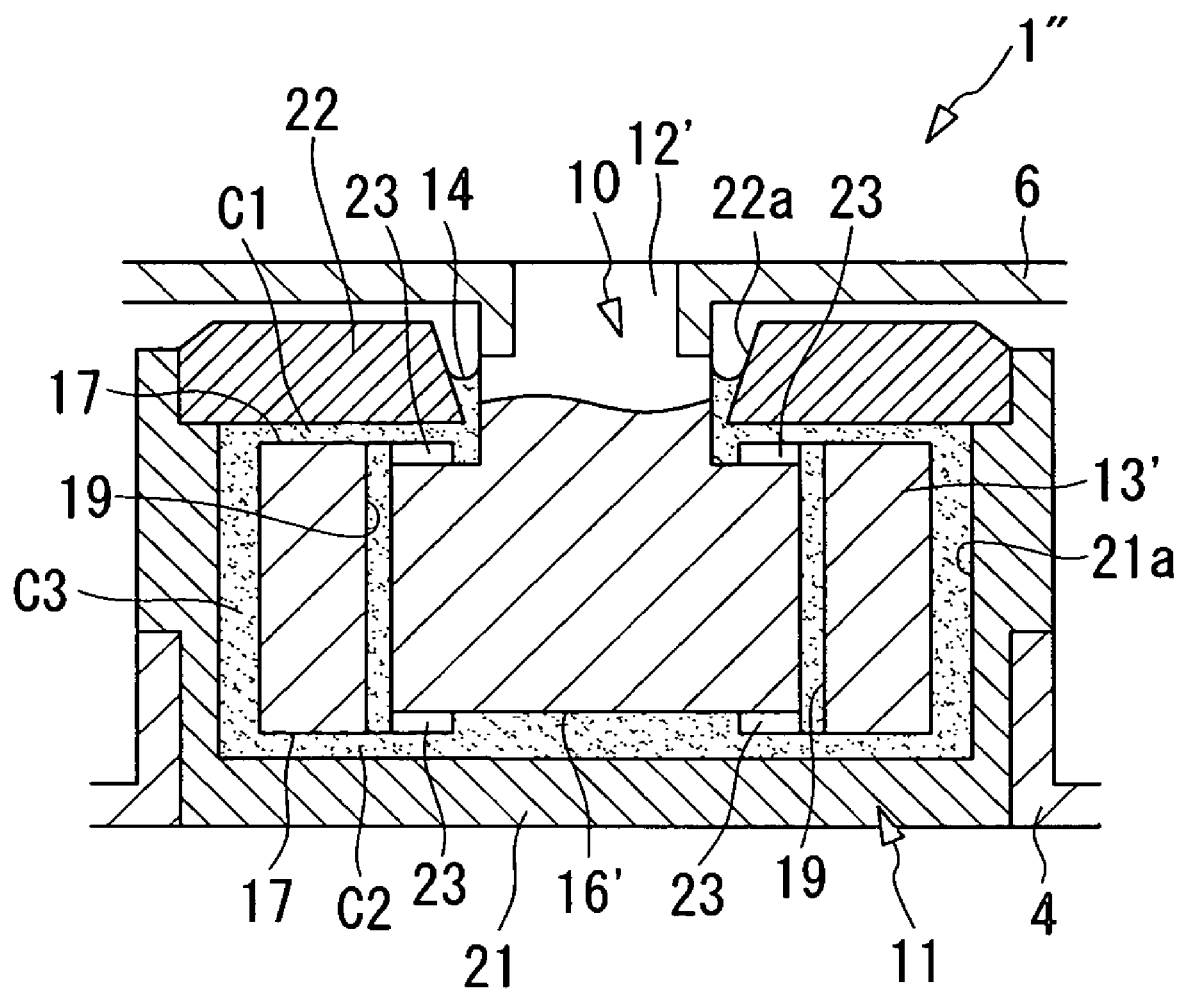
FIG. 10 is a longitudinal sectional view showing a modified example with the through holes and communicating cavities provided in the thrust bearing plate of the fluid dynamic pressure bearing of FIG. 9.

Moreover, in the present embodiment, a fluid dynamic pressure bearing 1 is described that has a shaft 10 having a thrust bearing plate 13 located in the midway position in the longitudinal direction of the shaft body 12. However, alternatively, as shown in FIG. 8 to FIG. 10, fluid dynamic pressure bearings 1' and 1" may be used, which have a shaft 10' wherein one end of a shaft body 12' is provided with a thrust bearing plate 13', and the outer peripheral surface of the thrust bearing plate 13' is provided with radial dynamic pressure generating grooves 15'. In this case, instead of the ring grooves 16, circular inner side grooves 16' are formed in the center of the end face located on the shaft end.

FIG. 9 shows the fluid dynamic pressure bearing 1' with a construction in which through holes 19 opening to dynamic pressure generating faces 17 are provided with chamfer sections 20, and FIG. 10 shows the fluid dynamic pressure bearing 1" with a construction in which there are provided straight grooved communicating cavities 23 which connect the through holes 19 with the ring grooves 16, and the through holes 19 with inner side grooves 16'.

In the fluid dynamic pressure bearings 1' and 1" with such constructions, similarly to the fluid dynamic pressure bearing 1 of the above-described embodiment, there are effects in that bubbles due to rotation are prevented from being generated, and bubbles generated are discharged effectively, so that stable rotation can be maintained.

Figure 11:
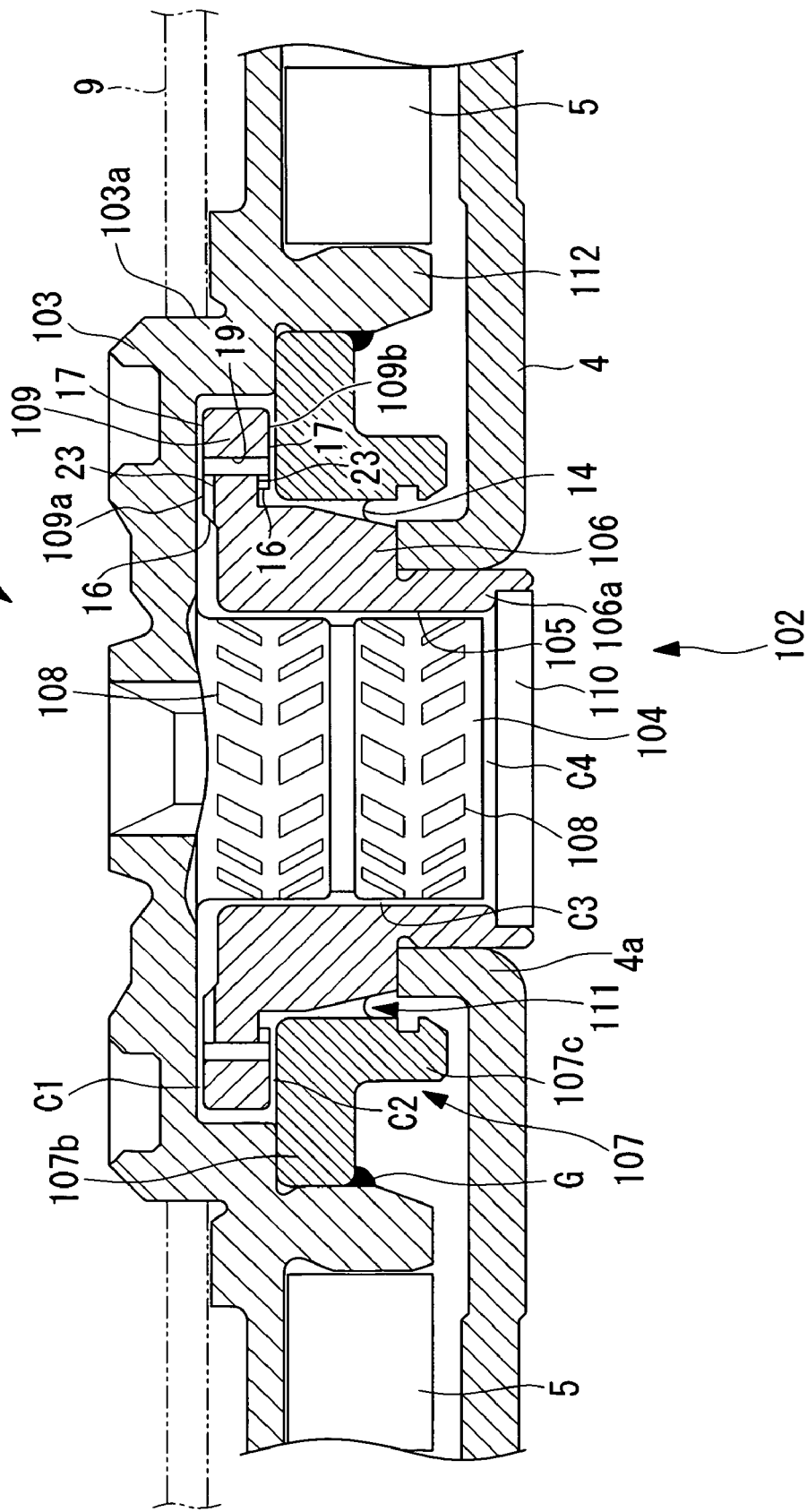
FIG. 11 is a longitudinal sectional view schematically showing a recording medium driving device, a motor, and a fluid dynamic pressure bearing according to a second embodiment of the present invention.
Figure 12:
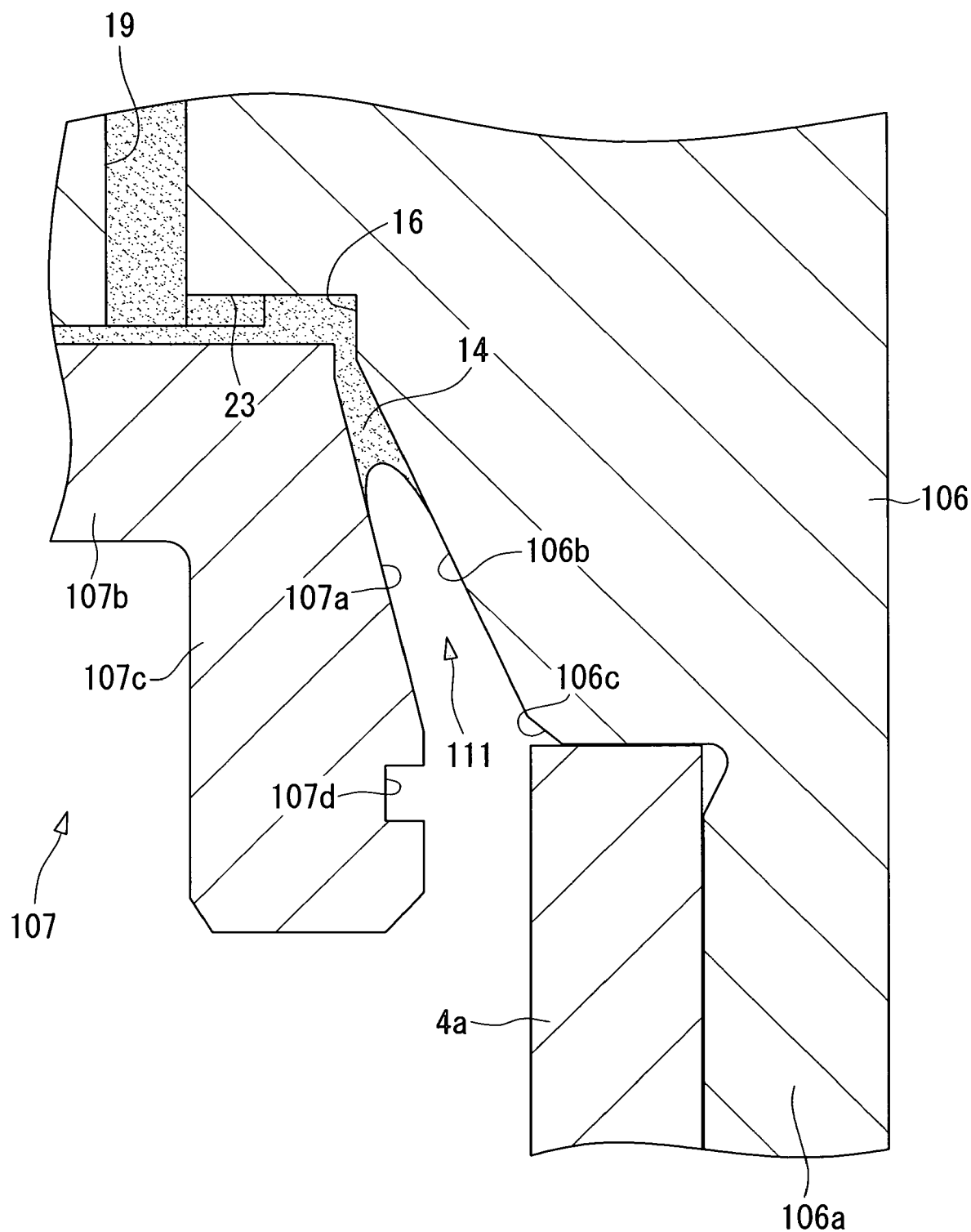
FIG. 12 is an enlarged sectional view showing a capillary seal of the fluid dynamic pressure bearing of FIG. 11.
Figure 13A:
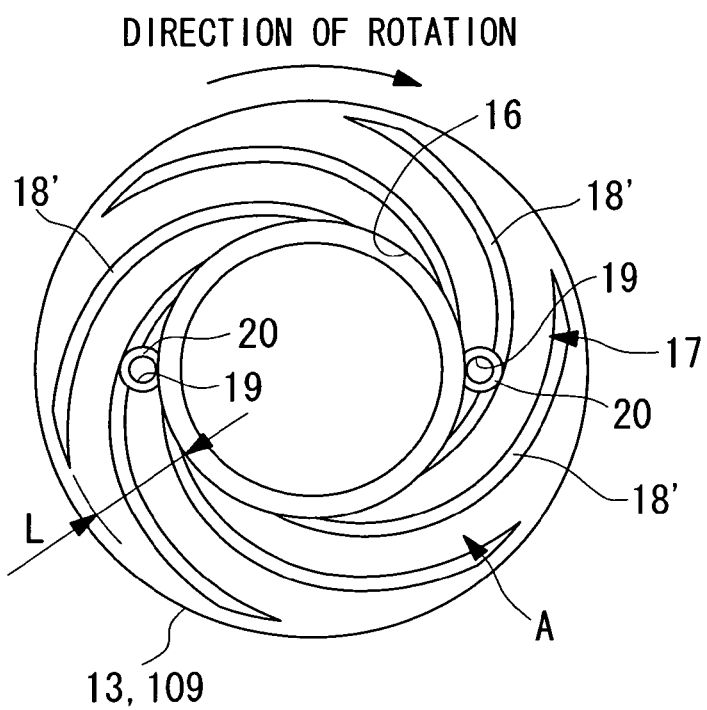
FIG. 13A and FIG. 13B are plan views showing a modified example of thrust dynamic pressure generating grooves on the dynamic pressure generating faces of FIG. 3A and FIG. 3B.
Figure 13B:
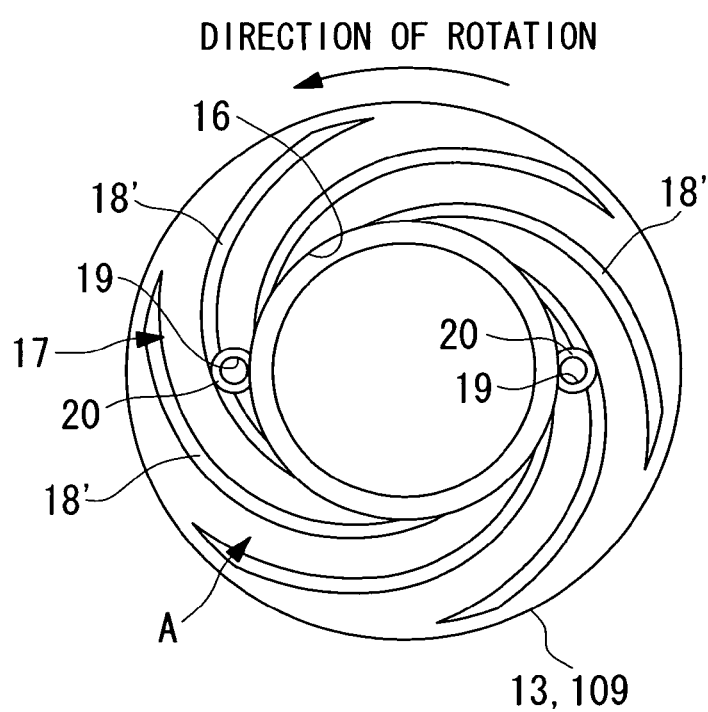
Figure 14A:
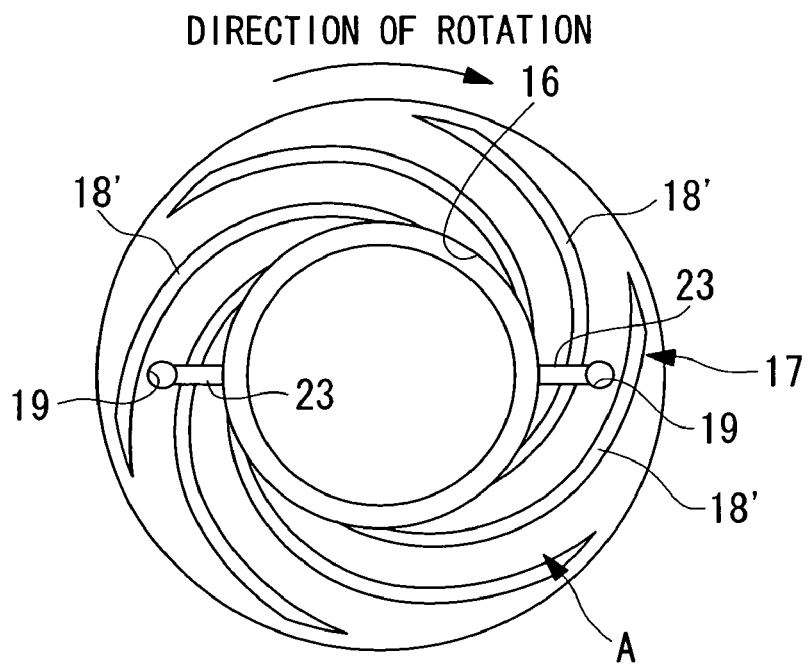
FIG. 14A and FIG. 14B are plan views showing a modified example of thrust dynamic pressure generating grooves on the dynamic pressure generating faces of FIG. 5A and FIG. 5B.
Figure 14B:
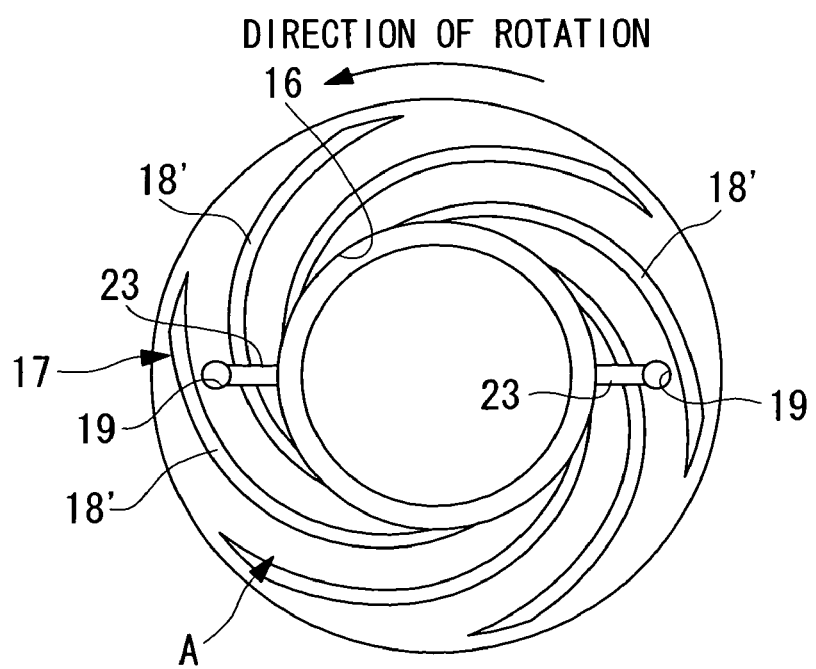
Figure 15A:
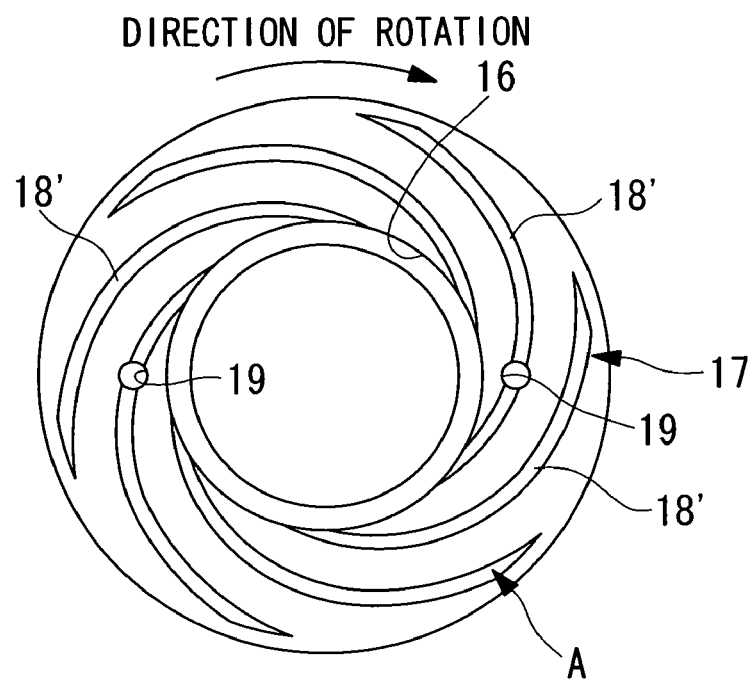
FIG. 15A and FIG. 15B are plan views showing a modified example of thrust dynamic pressure generating grooves on the dynamic pressure generating faces of FIG. 7A and FIG. 7B.
Figure 15B:
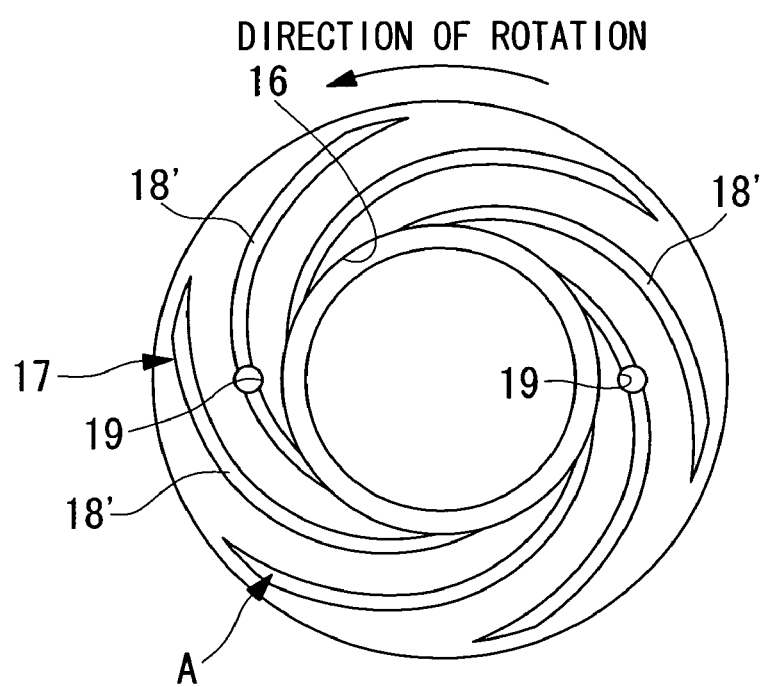

Next is a description of a fluid dynamic pressure bearing, a motor, and a recording medium driving device according to a second embodiment of the present invention with reference to FIG. 11 and FIG. 12.

In the description of the present embodiment, the same symbols are used for those parts whose structures are common to the first embodiment, and the descriptions are omitted.

A recording medium driving device 101 according to the present embodiment differs from the recording medium driving device 2 according to the first embodiment in the construction of a fluid dynamic pressure bearing 102.

As shown in FIG. 11, the fluid dynamic pressure bearing 102 according to the present embodiment is provided with a substantially cylindrical shaft body 104 which is formed integral with a rotor (shaft) 103, a housing 106 which has a shaft body insertion hole 105 for accommodating the shaft body 104 rotatably and is fixed in a stator 4, and a detachment prevention member 107 which is fixed to the rotor 103. Minute gaps C1 to C4 are formed between the shaft body 104, the housing 106, and the detachment prevention member 107, and the minute gaps C1 to C4 are filled with oil (working fluid) 14. In this manner, the fluid dynamic pressure bearing 102 is formed. In the figure, reference symbol 103a denotes a fitting surface onto which a recording medium 9 is fitted to secure it.

A plurality of radial dynamic pressure generating grooves 108 is formed in the outer peripheral surface of the shaft body 104. The radial dynamic pressure generating grooves 108 are two sets of so-called herringbone grooves comprising grooves that extend diagonally in one direction from the tip end side of the shaft body 104 with respect to the generatrix of the cylindrical surface forming the outer peripheral surface of the shaft body 104, and grooves that extend diagonally in the opposite direction from the proximal end side of the shaft body 104, arranged in the axial direction. The herringbone grooves shown in FIG. 11 are formed by separated grooves with different angles of inclination. However, they may be formed as continuous grooves folded in a V shape.

The housing 106 is formed substantially cylindrically, and is provided with a fitting section 106a that fits together with the boss 4a of the stator 4, and a flange shaped thrust bearing plate 109 that extends outwardly in the radial direction over the whole of the outer peripheral surface at one end. The tip end of the fitting section 106a is closed in a sealed state by a bottom plate 110. Ring grooves 16 and dynamic pressure generating faces 17 are provided on the two thickness direction end faces 109a and 109b of the thrust bearing plate 109, similarly to those in the thrust bearing plate 13 in the first embodiment shown in FIG. 5A and FIG. 5B. Furthermore, the thrust bearing plate 109 is provided with a plurality of through holes 19 which pass through it in the thickness direction so as to open to the dynamic pressure generating faces 17, and communicating cavities 23 are formed therein which connect the through holes 19 and the ring grooves 16.

As shown in FIG. 12, the outer peripheral surface of the housing 106 incorporates a housing sealing surface 106b which forms a capillary seal 111 together with a detachment prevention section sealing surface 107a which is described later. The housing sealing surface 106b is formed as a tapered surface that inclines gradually inward in the radial direction toward the fitting section 106a. Furthermore, an oil draining surface 106c, which is formed in a chamfer shape, is provided at the boundary of the step difference between the housing sealing surface 106b and the fitting section 106a.

The detachment prevention member 107 is provided with a detachment prevention ring plate 107b which sandwiches the thrust bearing plate 109 between itself and the rotor 103 via the minute gaps C1 and C2 by being fixed to a yoke 112 of the rotor 103, and a sealing cylinder section 107c which forms the capillary seal 111 between itself and the outer peripheral surface of the housing 106. The rotor 103 is prevented from being detached from the housing 106 by the detachment prevention ring plate 107b. The detachment prevention ring plate 107b and the yoke 112 may be fastened with glue G, or may be fastened by welding. However, it is necessary to join the two in a sealed state such that oil 14 does not leak from any gap.

The sealing cylinder section 107c is provided on the inner peripheral side of the detachment prevention ring plate 107b, and its inner periphery incorporates the detachment prevention section sealing surface 107a, which forms the capillary seal 111 with the housing sealing surface 106b. The detachment prevention section sealing surface 107a is formed as a tapered inner surface that inclines inwardly in the radial direction away from the detachment prevention ring plate 107b. As a result, the capillary seal 111 formed between the housing sealing surface 106b and the detachment prevention sealing surface 107a is formed such that as it gets farther away from the thrust bearing plate 109, the gap is enlarged gradually. Furthermore, a peripheral groove 107d are formed in the vicinity of the tip of the detachment prevention section sealing surface 107a.

The uniform minute gap C3 is formed between the outer peripheral surface of the shaft body 104 in which the radial dynamic pressure generating grooves 108 are formed, and the inner surface of the shaft body insertion hole 105 facing thereto, in a state in which the shaft body 104 is located in the center of the shaft body insertion hole 105. Moreover, the minute gaps C1 and C2 are formed between each of the dynamic pressure generating faces 17 of the thrust bearing plate 109, and the surface (thrust bearing surface) of the rotor 103 and the surface (thrust bearing surface) of the detachment prevention ring plate 107b, facing thereto, respectively.

Hereunder is a description of the fluid dynamic pressure bearing 102 according to the present embodiment constructed in this manner, and the operation of a motor and a recording medium driving device 101.

When the rotor 103 is rotated in one direction with respect to the stator 4 by the drive of the motor, the shaft body 104, which is joined together with the rotor 103, is rotated in the same direction in the shaft body insertion hole 105 of the housing 106 fixed to the stator 4. At this time, dynamic pressure is generated in the minute gaps C1, C2 and C3 by the radial dynamic pressure generating grooves 108 provided in the outer face of the shaft body 104, and the thrust dynamic pressure generating grooves 18 provided in the two end faces 109a and 109b of the thrust bearing plate 109, respectively. Since the dynamic pressure generated on the outer face of the shaft body 104 is generated in a full circle uniformly, the shaft body 104 is held in the central position of the shaft body insertion hole 105 in equilibrium. Furthermore, since the dynamic pressures generated on the two end faces 109a and 109b of the thrust bearing plate 109 apply equal dynamic pressure to the thrust bearing plate 109 in opposing directions in the thickness direction, the thrust bearing plate 109 is held in an equilibrium position in the thickness direction whereby the minute gaps C1 and C2 are equal.

In this case, since dynamic pressure is not generated when the motor is stopped, the rotor 103 drops down with respect to the housing 106 in the direction of gravity. Accordingly, in the case where the recording medium driving device 101 is installed in the up/down relationship as shown in FIG. 11 for example, the rotor drops down in the axial direction with respect to the housing 106, so that the gap C2 on the lower side of the thrust bearing plate 109 is smaller than the gap C1 on the upper side. If the motor starts operating in this state, the oil 14 is drawn through the gaps C1 and C2 outward in the radial direction from the ring grooves 16 side by the thrust dynamic pressure generating grooves 18. However, similarly to the fluid dynamic pressure bearing 1 according to the first embodiment, in the fluid dynamic pressure bearing 102 according to the present embodiment, since the through holes 19 are provided opening to the dynamic pressure generating faces 17, the oil 14 is supplied from the large gap C1 on the upper side to the small gap C2 on the lower side via the through holes 19.

As a result, an excess negative pressure state is prevented from occurring in the small gap C1 due to the oil 14 being drawn through, which prevents bubbles from being generated in the oil 14 in advance. Especially, by opening the through holes 19 to the dynamic pressure generating faces 17, it is possible to supply the oil 14 to the dynamic pressure generating faces 17 directly, and it is possible to prevent bubbles from being generated even if the oil 14 is drawn rapidly during starting.

By preventing bubbles from being generated in the oil 14, it is possible to prevent the dynamic pressure generated in the dynamic pressure generation area A from fluctuating, and to rotate the rotor 103 stably and without oscillation. Furthermore, by preventing bubbles from being generated, it is possible to always interpose the oil 14 between the rotor 103 and the housing 106, and the housing 106 and the detachment prevention member 107. As a result, it is possible to prevent damage and the like due to contact of the rotor 103 and the housing 106, or contact of the housing 106 and the detachment prevention member 107.

Moreover, it is possible to prevent the oil 14 from being expelled from the gaps C1 to C4 due to the generation of bubbles, and to prevent the occurrence of an undesirable situation such as oil leakage or the like. Furthermore, since the oil 14 is prevented from leaking, it is not necessary to provide an absorbing member for absorbing leaked oil 14, thus making it easy to aim at making the recording medium driving device 101 thinner.

Moreover, if bubbles are generated in the oil 14, or bubbles have been intermixed, when the motor is stopped, the bubbles stagnate in the comparatively large capacity of the ring grooves 16. In the fluid dynamic pressure bearing 102 according to the present embodiment, since there are communicating cavities 23 which connect the through holes 19 opening to the dynamic pressure generating faces 17 and the ring grooves 16, the bubbles stagnating in the ring grooves 16 are drawn into the through holes 19 via the communicating cavities 23 by the rotation of the rotor 103. Since the bubbles drawn in stagnate in the through holes 19, it is possible to prevent the abovementioned range of inconveniences from occurring due to the bubbles stagnating in the dynamic pressure generation area A.

Furthermore, in the fluid dynamic pressure bearing 102 according to the present embodiment, since the through holes 19 are provided in two positions symmetrical about the central axis, the oil 14 can be distributed and supplied to the dynamic pressure generation area A evenly. Since the housing 106 is fixed to the stator 4, the through holes 19 need not be positioned axially symmetrically, and they may be provided in three or more places.

According to the recording medium driving device 101 incorporating the motor and the fluid dynamic pressure bearing 102 according to the present embodiment constructed in this manner, the recording medium 9 can be rotated stably without oscillation. Therefore, it is possible to write information to the recording medium 9, and to read information from the recording medium 9, reliably.

The thrust dynamic pressure generating grooves 18 are formed such that the dynamic pressure generated is higher around the outer peripheral rim than around the inner peripheral rim of the thrust bearing plate 109 by positioning the folding points of the thrust dynamic pressure generating grooves 108 towards the outside in the radial direction, or making the heights of the thrust dynamic pressure generating grooves 18 different between the inside and the outside in the radial direction. Therefore, the force around the outer peripheral rim of the thrust bearing plate 109, which supports the rotor 103, becomes stronger. As a result, the rotor 103 can be supported stably when the rotor 103 rotates, thus improving NRRO (Non-Repeatable Runout).

Furthermore, a surface tension acts on the oil 14 in the capillary seal 111 in the direction wherein the area of the liquid surface decreases by virtue of its surface tension, that is the direction whereby the distance between the housing seal surface 106b and the detachment prevention section sealing surface 107a decreases. Therefore, the capillary seal 111 can retain the oil 14 so that it cannot leak out.

Moreover, when the rotor 103 rotates, the oil 14 also rotates due to the friction against the detachment prevention section sealing surface 107a, and centrifugal force acts on the oil 14. The oil 14 is pushed to the detachment prevention section sealing surface 107a by the centrifugal force, and pushed into the thrust bearing plate 109 side along the detachment prevention section sealing surface 107a. As a result, the capillary seal 111 can further improve the retention of the oil 14 when the rotor 103 rotates.

Furthermore, since the oil 14 can be prevented from leaking, it is not necessary to provide an absorbing member for absorbing leaked oil 14, thus making it easy to aim at making the recording medium driving device 101 thinner.

The thrust dynamic pressure generating grooves 18 may be formed on the end faces 109a and 109b of the thrust bearing plate 109 as described above, or they may also be formed on the inner face of the rotor 103 facing the end face 109a, and the face of the detachment prevention ring plate 107b facing the end face 109b.

Moreover, in the present embodiment, the description is for the case having communicating cavities 23 which connect the through holes 19 and the ring grooves 16. However, alternatively, similarly to those shown in FIG. 3A, FIG. 3B, and FIG. 4, chamfer sections 20, which are provided in the opening portions of the through holes 19, may be used as communicating cavities. Furthermore, as shown in FIG. 7A and FIG. 7B, the arrangement may be such that the through holes 19 are formed in locations coinciding with some of the thrust dynamic pressure generating grooves 18, and the thrust dynamic pressure generating grooves 18 themselves are utilized as communicating cavities which connect the through holes 19 and the ring grooves 16.

Figure 16A:
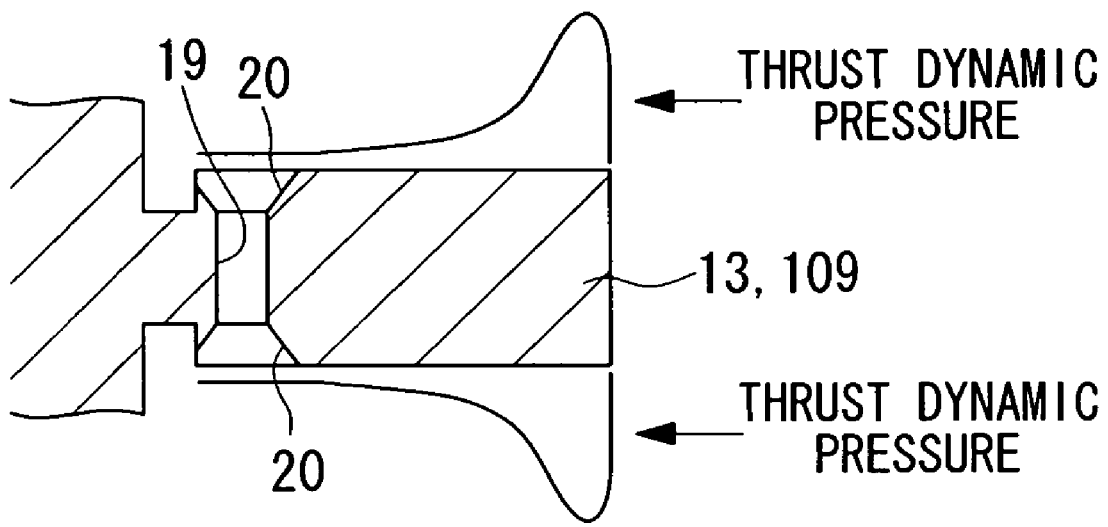
FIG. 16A and FIG. 16B are conceptual diagrams showing a comparison of the peak positions of thrust dynamic pressure generation using a spiral groove (FIG. 16A) and using a herringbone groove (FIG. 16B).
Figure 16B:
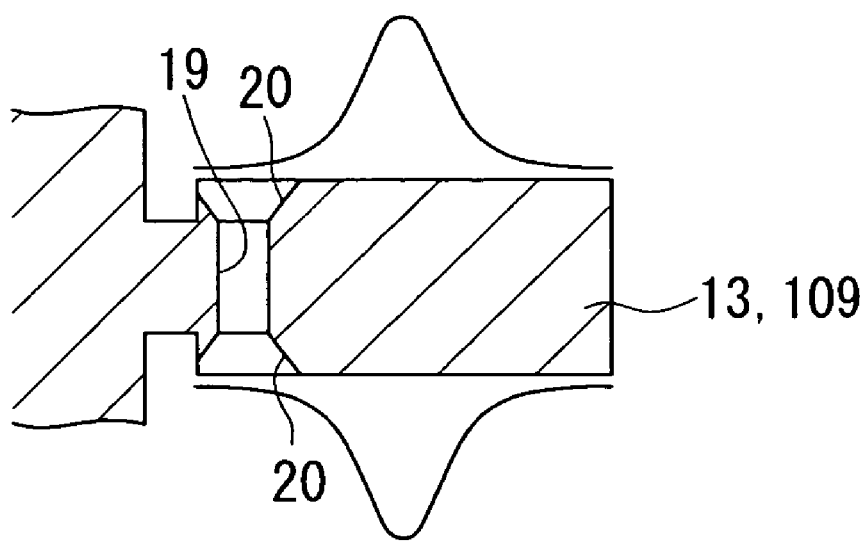

Moreover, the above embodiments are described using herringbone grooves as an example for the thrust dynamic pressure generating grooves 18 provided on the end faces 109a and 109b of the thrust bearing plate 109. However, alternatively, as shown in FIG. 13A, FIG. 13B to FIG. 16A, FIG. 16B, thrust dynamic pressure generating grooves 18' formed from spiral grooves may also be used. FIG. 13A to FIG. 15B correspond to FIG. 3A and FIG. 3B, FIG. 5A and FIG. 5B, and FIG. 7A and FIG. 7B respectively. Moreover, FIG. 16A and FIG. 16B are conceptual diagrams showing a comparison of the peak positions of thrust dynamic pressure generation using a spiral groove (FIG. 16A) and using a herringbone groove (FIG. 16B).

By using the spiral grooves of FIG. 13A, FIG. 13B to FIG. 15A, FIG. 15B, the peak of thrust dynamic pressure is generated near the outermost edge in any situation. Accordingly, when the rotor 103 rotates, the rotor 103 can be supported stably, and NRRO (Non-repeatable Runout) is also improved. Furthermore, if the dynamic pressure effective width L, being the width of the dynamic pressure generation area A in the radial direction, is reduced, it is especially effective.

As above, the embodiments of the present invention are described in detail with reference to the drawings. However, specific constructions are not limited to the embodiments, and any design changes and the like that do not depart from the gist of the present invention are also included.

The invention claimed is:

1. A fluid dynamic pressure bearing comprising, a shaft having a shaft body and a thrust bearing plate which extends in the radial direction all around the outer peripheral surface of the shaft body, a housing for housing the shaft such that it rotates freely, and a working fluid filling a gap between the shaft and the housing, and there is provided an annular dynamic pressure generating face made by forming a dynamic pressure generating groove, which draws the working fluid toward a midway position in the radial direction from the inside and outside of the thrust bearing plate in the radial direction, or toward a position near an outer peripheral rim from the inside in the radial direction, when the shaft and the housing are rotated relative to each other about the axis, on the thickness direction end face of the thrust bearing plate or on an inner surface of the housing facing the end face via a gap, and an inner groove section, which is located on an inner peripheral side of the dynamic pressure generating face and that is depressed more than the dynamic pressure generating face in the thickness direction, and there is provided a through hole which passes through the thrust bearing plate in the thickness direction so as to open to the dynamic pressure generating face, and there is provided a communicating cavity which connects the opening portion of the through hole and the inner groove section.

2. A fluid dynamic pressure bearing according to claim 1, wherein the communicating cavity is formed by a chamfer section formed in the opening portion of the through hole.

3. A fluid dynamic pressure bearing according to claim 1, wherein the communicating cavity is formed using a groove having an equal depth to the inner groove section.

4. A fluid dynamic pressure bearing according to claim 1, wherein the dynamic pressure generating groove is provided on the thrust bearing plate, the through hole is provided at a location coinciding with the dynamic pressure generating groove, and the communicating cavity is formed by a part of the dynamic pressure generating groove.

5. A fluid dynamic pressure bearing according to claim 1, wherein the communicating cavity is formed using an inclined groove, which gradually becomes shallower from the inner groove section toward the opening portion of the through hole.

6. A motor comprising, a fluid dynamic pressure bearing according to claim 1, and a driving device which rotates the housing and the shaft of the fluid dynamic pressure bearing relative to each other.

7. A recording medium driving device, which comprises the motor according to claim 6, and is provided with a fixing section which fixes a recording medium to the shaft or the housing.

8. A fluid dynamic pressure bearing comprising, a shaft having a substantially cylindrical shaft body, and a substantially cylindrical housing which has a shaft body insertion hole for accommodating the shaft body rotatably, and on an outer peripheral surface of the housing is provided a flange shaped thrust bearing plate that extends in the radial outward direction all around the periphery, and on the shaft is provided a thrust bearing plate which faces an end face in the thickness direction of the thrust bearing plate via a gap, and there is provided an annular dynamic pressure generating face made by forming a dynamic pressure generating groove, which draws a working fluid toward a midway position in the radial direction from the inside and outside of the thrust bearing plate in the radial direction, or toward a position near an outer peripheral rim from the inside in the radial direction, when the shaft and the housing are rotated relative to each other about the axis, on the thickness direction end face of the thrust bearing plate or on an inner surface of the housing facing the end face via a gap, and an inner groove section, which is located on an inner peripheral side of the dynamic pressure generating face and that is depressed more than the dynamic pressure generating face in the thickness direction, and there is provided a through hole which passes through the thrust bearing plate in the thickness direction so as to open to the dynamic pressure generating face, and there is provided a communicating cavity which connects the opening portion of the through hole and the inner groove section.

9. A fluid dynamic pressure bearing according to claim 8, wherein the communicating cavity is formed by a chamfer section formed in the opening portion of the through hole.

10. A fluid dynamic pressure bearing according to claim 8, wherein the communicating cavity is formed using a groove having an equal depth to the inner groove section.

11. A fluid dynamic pressure bearing according to claim 8, wherein the dynamic pressure generating groove is provided on the thrust bearing plate, the through hole is provided at a location coinciding with the dynamic pressure generating groove, and the communicating cavity is formed by a part of the dynamic pressure generating groove.

12. A fluid dynamic pressure bearing according to claim 8, wherein the communicating cavity is formed using an inclined groove, which gradually becomes shallower from the inner groove section toward the opening portion of the through hole.

* * * * *